Oct. 25, 1949.  M. J. OST  2,486,320

MIXING BOWL COVER

Filed Jan. 4, 1949

INVENTOR.
Marie J. Ost
BY
Harold F. Scribner

Patented Oct. 25, 1949

2,486,320

UNITED STATES PATENT OFFICE 2,486,320

MIXING BOWL COVER

Marie J. Ost, Mountainside, N. J.

Application January 4, 1949, Serial No. 69,187

1 Claim. (Cl. 259—125)

The present invention relates generally to kitchen accessories and more particularly to mixing bowl covers adapted and arranged to enable the user to mix the contents without splashing the ingredients externally of the bowl.

A primary aim of the invention is to render available an expansible bowl cover adapted to fit snugly over the rim of bowls of various sizes within a moderate range, and to provide an opening in the cover, preferably with contractible margins, adapted normally to fit snugly about a mixing utensil such as a hand beater but which may be considerably enlarged at will, for the purpose of inserting or withdrawing the enlarged head of a hand beater without removing the cover from the bowl.

Bowl covers of the past have been made either of imperforate sheet-like material or have been fashioned with a relatively small opening adapted to fit the shaft of a tool, i. e. the stem end of a detachable power beater. While such covers served their special purpose they were difficult to use for the reason that only shafts of tools could be passed through and they were to be inserted and withdrawn from the underside or bowl side of the cover.

The present invention aims to provide a new article for covering mixing bowls that readily admits of inserting or withdrawing large mixing tools through the cover from the upper side of the covered bowl and which is constructed to maintain the bowl and contents effectively covered and the contents confined during a mixing or beating operation.

The invention further aims to produce a cover, embodying the foregoing characteristics, that may be inexpensively fabricated and one which may be easily and effectively cleaned after each use. By way of further improvement the invention proposes a mixing bowl cover of this character, fashioned of material that is transparent or semi-transparent in nature so that the user may follow the mixing operation through the cover itself and thus be appraised of the condition of the mix without first removing the cover from the bowl.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a plan view of a bowl cover incorporating the invention.

Figure 1:
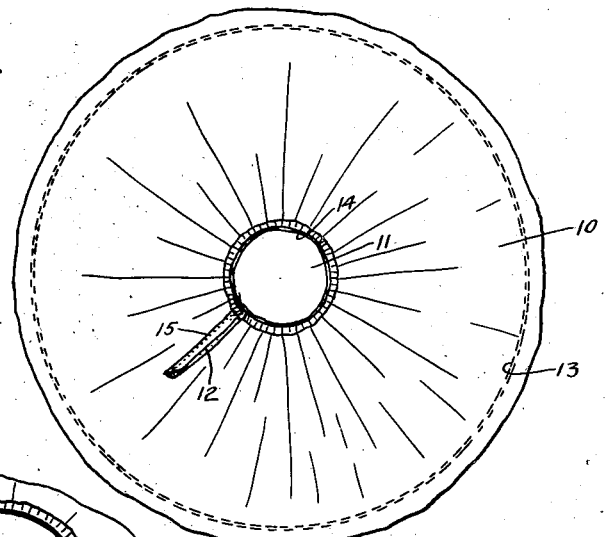
Figure 2:
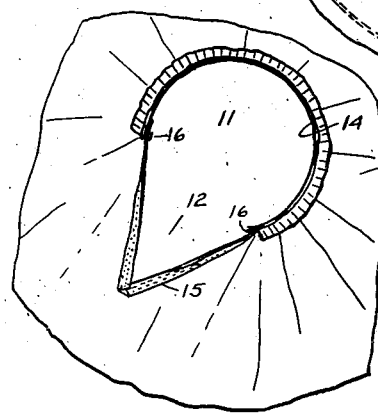
Fig. 2 is a fragment view of the cover in opened position for receiving a mixing head.
Figure 4:
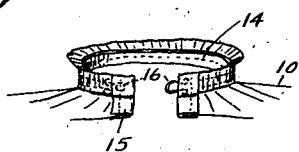
Fig. 4 is a detail view of a preferred means of fastening the cover in closed condition around a mixing utensil.
Figure 3:
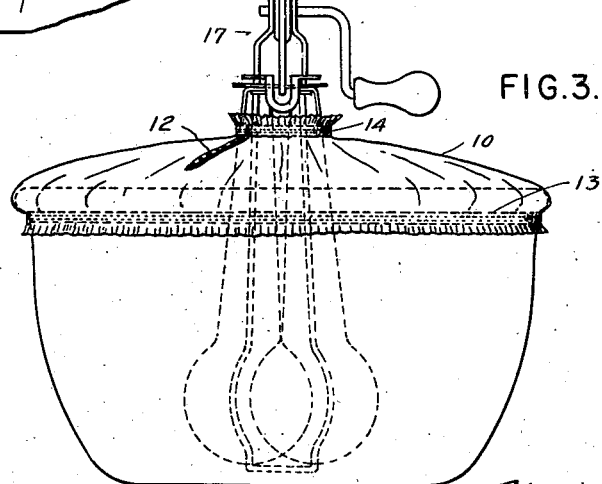
Fig. 3 is an elevational view of the cover applied to a bowl and a mixing beater of the hand operated type, in a typical operating position.

In achieving the aims of the invention it is proposed to cut a circle out of a piece of sheet like material 10 preferably material that is pliable and transparent such as oiled silk or one of the plastic materials, and to form a relatively small hole 11, in the center thereof. The size of the original circle should be slightly larger than the bowl diameter so as to lap over and down its rim. Extending somewhat radially of the center hole, a slit 12 is made which progresses approximately half-way across the sheet toward the outer edge.

Inwardly from the marginal edge of the circular sheet an endless elastic band 13 is stitched in a manner as to shir the marginal portions of the sheet. The band 13 is relatively flat in cross section and is sewed with one of its flat sides to the sheet 10. As a result, the band and the shirred marginal portions of the sheet are caused to stand edgewise to the original plane of the sheet. When stretched over a bowl rim, the elastic marginal portion of the sheet fits snugly against the sides of the bowl while the main portions of the sheet overlay the open top of the bowl.

The central hole 11 in the sheet is also provided with an elastic tape 14 starting at one side of the cut 12 and ending at the other side of the cut. The tape 14 is stitched flatwise to the sheet slightly away from the margins of the hole 11 with a shirring stitch. The tape 14 and the endless band 13 are each stitched or otherwise secured preferably to the underside of the sheet, and when the article is in use, form elastic collars standing somewhat perpendicular to the plane of the sheet.

The edges of the cut 12 are preferably bound on both sides and along both edges with a single piece of binding material 15. The binding 15 is medially folded and both sides stitched to the intervening edge portion of the sheet 10 around the cut, and effectively reinforces the cut and gives a finish to the edge. Where the ends of the binding overlap the ends of the inner collar 14, the double stitching further reinforces and strengthens those regions.

The ends of the inner collar are normally connected by a releasable fastener, a suitable type being the conventional hook and eye indicated at 16 in the drawings. By setting the eye of the fastener outward from the end of the collar and the hook inwardly from the other end of the collar, the end portions and the bound edges of the cut 12 will be caused to lap one another and form an effective closure when the fastener parts are interengaged.

In using the bowl cover, the sheet 10 is stretched over the rim of the bowl, the elasticity of the outer collar holding the sheet in place. Thereafter, the inner collar is un-hooked whereby a large and expansible opening is provided for the insertion, from the upper side of the cover, of a mixing utensil, such as a hand beater 17. The enlarged opening is next closed about the shank of the mixing utensil by the fastener 16 so that the contents of the bowl are effectively confined during a mixing operation. To remove the mixing utensil the inner collar is unfastened whereby again to provide an enlarged opening for withdrawal of the utensil without the need of uncovering the bowl.

It will be further observed that the elastic collar portions are self-accommodating for use with any of a relatively wide range of bowl sizes and mixing utensils and being somewhat transparent provides the user with a practical and serviceable kitchen accessory.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of the United States:

A work cover for a mixing bowl adapted to confine the contents of the bowl during a mixing operation comprising a one-piece sheet of pliable material having an endless elastic band of less length than the perimeter of the sheet secured to the outer marginal portion thereof operable to form an elastic collar adapted to be stretched over the rim of a mixing bowl, said sheet also having a relatively small opening centrally located therein, and said sheet also having a slit extending outwardly from one edge of the central opening toward but terminating short of the outer margins of the sheet whereby to form complementary placket portions radiating from the central opening operable when the cover is in position on a bowl to provide an enlarged opening for the passage of a mixing utensil, elastic tape means secured to the marginal portions of the sheet bounding the central opening operable when the said placket opening is closed to form an endless elastic collar about the shank of an inserted mixing utensil, and releasable means carried by the placket portions to fasten said portions together whereby to close the placket opening and render the elastic collar effective.

MARIE J. OST.

REFERENCES CITED

The following references are of record in the file of this patent:

UNITED STATES PATENTS

| Number | Name | Date |
| --- | --- | --- |
| 691,223 | Whitely et al. | Jan. 14, 1902 |
| 1,124,747 | Karr | Jan. 12, 1915 |
| 2,028,454 | Johnson | Jan. 21, 1936 |
| 2,193,356 | Green | Mar. 12, 1940 |